MAGNETIC THIN FILM MEMORY APPARATUS WITH ELONGATED APERTURE
Filed Dec. 23, 1963
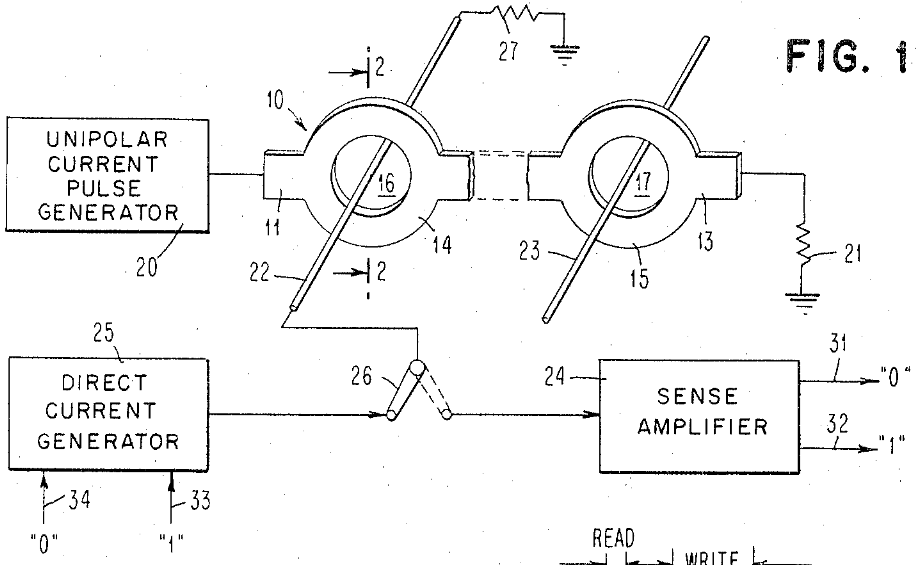
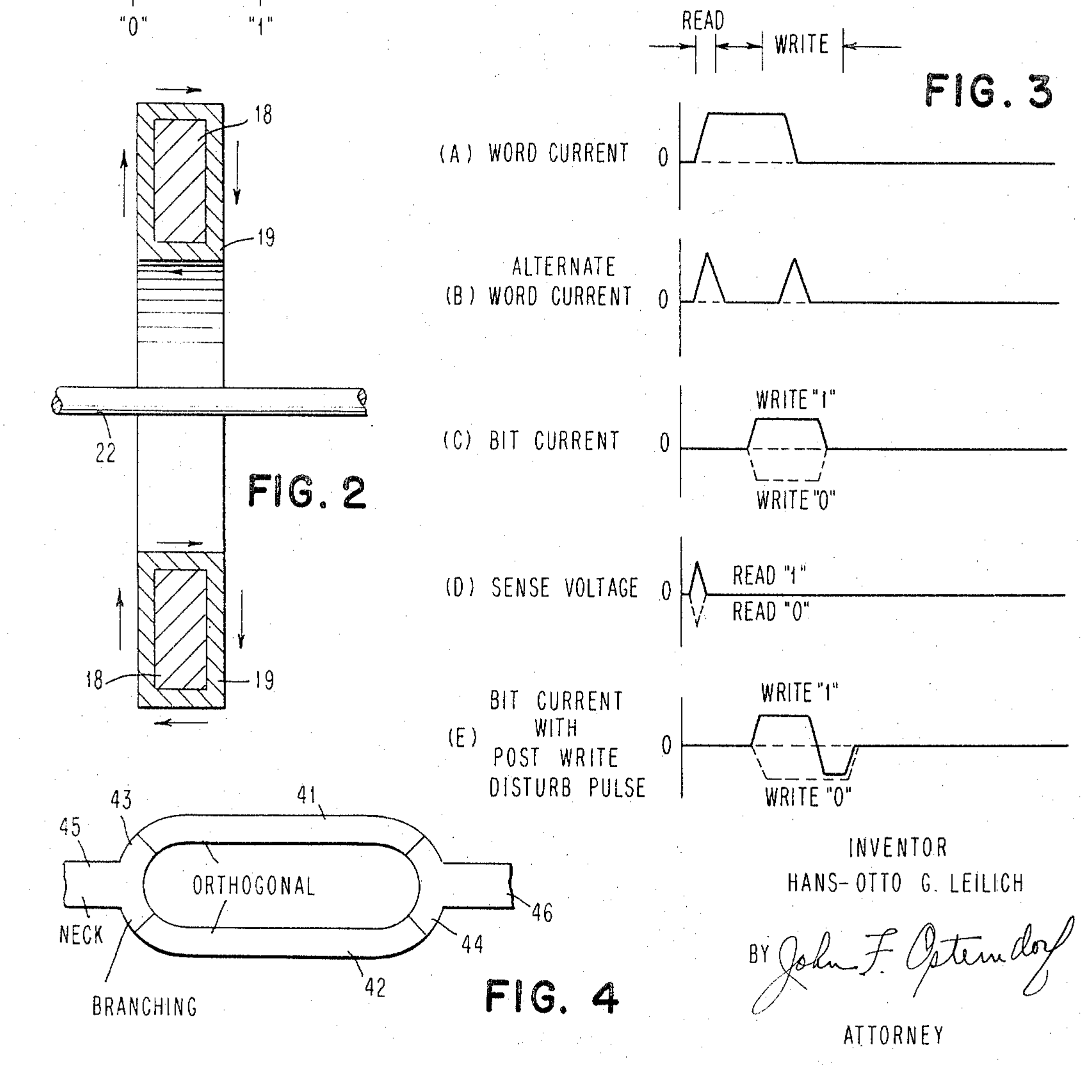
FIG. 1, FIG. 2, FIG. 3, FIG. 4
INVENTOR
HANS-OTTO G. LEILICH
BY John F. Ostendorf
ATTORNEY United States Patent Office 3,378,821

Patented Apr. 16, 1968

3,378,821

MAGNETIC THIN FILM MEMORY APPARATUS WITH ELONGATED APERTURE

Hans-Otto G. Leilich, Poughkeepsie, N.Y., assignor to International Business Machines Corporation, New York, N.Y., a corporation of New York Filed Dec. 23, 1963, Ser. No. 332,588
3 Claims. (Cl. 340—174)

This invention relates to magnetic memory apparatus and, more particularly, to a magnetic strip memory of the closed flux path type operable in response to unipolar current pulses to obtain access to the storage devices of the memory.

Conductive magnetic strip memories in chain configurations have been proposed having apertures or perforations contained in particular portions of the strip. Around each aperture, the magnetic material is capable of acting as a storage device to establish a polarized remanent magnetic state indicative of a stored binary digit. This result is obtained in response to the application of direct current to a conductive winding disposed within the aperture, when applied during a part of the attenuated portion of a damped alternating sinusoid of current applied to the conductive strip. A memory system embodying these principles has been described in pending application Ser. No. 255,479, filed Feb. 1, 1963, in the names of James C. Sagnis, Jr., and Paul E. Stuckert and assigned to the same assignee as this invention.

Although the memory system described in this application has been fabricated at lower cost as compared with previous memory apparatus, it requires elaborate selection and drive circuitry to produce the damped sinusoid of alternating current necessary to perform the read and write operations for access to the storage devices. It is well known that a major portion of the cost for memory arrays is the associated circuitry. Consequently, if this elaborate circuitry for selecting and driving the storage devices of the memory can be eliminated, simplified or reduced in number, then concommitantly, the cost of the memory is reduced.

Accordingly, it is a general object of the invention to provide improved magnetic strip memory apparatus.

Another object of the invention is to accomplish an orthogonal write operation in closed flux path magnetic storage devices by employing unipolar current word pulses and bipolar bit current pulses.

It is another object of the invention to provide magnetic memory apparatus having closed flux path storage devices responsive to unipolar current pulses to effect read out from a device and to the coincidence of the unipolar current pulses with orthogonally applied direct current pulses to accomplish writing in a storage device.

The magnetic strip memory described in the aforementioned pending application is readily operable with a damped sinusoid of alternating current for the word driver. However, the feasibility of operation utilizing unipolar word drivers has not been determined for this type of magnetic memory storage system or with any other isotropic memory apparatus. Unipolar operation with isotropic or anisotropic magnetic material has been obtained by employing a new type of closed flux path storage device. Such a device has been described by J. L. Anderson, H. O. Leilich and D. H. Redfield in the IBM Technical Disclosure Bulletin at page 60, volume 5, No. 7, December 1962, and also in pending application, Ser. No. 332,746, filed Dec. 23, 1963, and assigned to the same assignee as this invention. As will be described more fully hereinafter, this memory unit employs a conductive substrate having a magnetic material plated thereon in a closed flux path type of configuration for the storage devices.

Thus, it is another object of the invention to provide a new type closed flux path magnetic storage apparatus operable for unipolar write pulse operation.

A further object of the invention is to provide magnetic memory apparatus having a conductive substrate in strip form and nickel-iron storage devices of magnetic material disposed thereon for operating to store binary digits in response to unipolar current pulses applied to the strip.

In accordance with an aspect of the invention, there is provided magnetic memory apparatus for storing binary digits comprising a conductive strip having at least one aperture therein. A memory element is formed around the aperture by depositing a magnetic material on the entire surface of the conductive strip around the aperture. The magnetic material is capable of assuming a polarized remanent magnetic state indicative of a stored binary digit. Connected to one end of the strip is a source of unipolar current pulses. Orthogonally disposed with respect to the source of unipolar current pulses and within the aperture is a conductive winding for carrying direct current to effect a write operation when the unipolar current pulse coincides with the direct current at the memory element.

One feature of the invention provides for the direct current source to be bipolar so that the polarity of the direct current determines the remanent flux state of the magnetic material and thus the state of the information stored.

Another feature of the invention provides for the conductive strip of chain form to have elongated portions at the storage devices to enhance the operating characteristics of the apparatus.

A further feature of the invention provides for the strip to be formed of copper material with a relatively thin nickel-iron magnetic layer plated on it to form a closed magnetic flux path for the storage device.

The foregoing and other objects, features and advantages of the invention will be apparent from the following more particular description of the preferred embodiment of the invention as illustrated in the accompanying drawing, wherein:

FIGURE 1 is a schematic diagram of a strip memory with the selection apparatus associated with one storage position of it;

FIGURE 2 is a sectional view of a memory element portion of the strip of FIGURE 1 on the section lines 2—2;

FIGURE 3 is a graphical representation of various electrical signal conditions found in the operation of the apparatus of FIGURE 1; and FIGURE 4 is a schematic diagram of an alternative form of a storage device which may be used in the invention.

Referring now to FIGURE 1, the principles of the invention are applied to a conductive strip member generally indicated at 10. The member has neck portions 11, 12, 13 joining the toroidal portions 14 and 15. The toroidal portions 14 and 15 form storage devices and have perforations or apertures therein at 16 and 17, respectively. Although two such storage devices are shown, it should be understood that many such memory elements may be formed in a single conductive strip member.

As previously stated, the strip member is described more particularly in the aforementioned IBM Technical Disclosure Bulletin and also in the pending application Ser. No. 332,746, filed Dec. 23, 1963, and assigned to the same assignee as the present invention. However, to facilitate the understanding of this invention the conductive member may comprise a copper substratum portion with a nickel-iron magnetic material coated on the toroidal portions of the unit. Referring to FIGURE 2, the conductive substratum portion 18 may be an etched copper strip approximately 3 mils in thickness. The layer of magnetic material 19 has a thickness in the order of 20,000 Angstrom units and is elevctrolessly plated on the copper substrate. It may have a composition of approximately 80% nickel and 20% iron. This material may be isotropic or anisotropic in nature having polarized remanent flux states of magnetization for storage. These states are parallel to the body of the toroid, i.e., for one state it would be a clockwise orientation and for the other state, it would be a counterclockwise orientation. The arrows associated with FIGURE 2 indicate the magnetic fields within the layer 19 at a particular instant when current is traveling through the substratum 18.

The neck portion 11 of conductive member 10 is connected to a unipolar current pulse generator 20. The neck portion 13 is at the other end of the conductive strip member may be terminated with a resistor 21 connected to ground reference potential. Bit-sense windings 22, 23 are threaded through the apertures 16, 17, respectively. A sense amplifier 24 and a direct current generator 25 are arranged for alternate connection to the winding 22 through a single pole-double throw switch 26. The winding 22 is terminated in an impedance 27 which is referenced to ground potential as are the sense amplifier 24 and the direct current generator 25.

Although bit-sense circuitry is shown as being connected to the winding 22 only, it should be understood that similar circuitry would be connected to the winding 23 threading the aperture 17 of the storage device 15. For simplicity only, one set of circuit apparatus is shown and described. Similarly, the generators 20 and 25, the sense amplifier 24 and the switch 26 may be operated under the control of a common clocking circuit which is not shown.

As already stated, this invention is directed to the operation of a magnetic coated conductive strip as a chain memory with a unipolar word driver and a bipolar bit driver. With reference to FIGURE 3, reading of the flux state of a particular storage device is effected by supplying a word current pulse to the chain 10 from the generator 20. As shown in the A and D curves of FIGURE 3, reading is accomplished during the rise transition of this current pulse. A positive or negative voltage spike is induced in the conductive winding 22 indicating that a binary 1 or binary 0, respectively, has been stored in the particular storage device. At the same time, the switch 26 is connected to the sense amplifier 24 enabling it to provide the indication at 31 if a binary 0 is stored in the device and at 32 if a binary 1 is stored.

Writing into a particular storage device is performed during the coincidence of the unipolar word current pulse and the direct current supplied by the generator 25 through the switch 26 to the conductive winding 22. The two currents are applied so that the magnetic fields generated by them are orthogonal with respect to each other. Dependent on the polarity of the direct current supplied by the generator 25 under the control of the inputs 33 and 34, a binary 1 or a binary 0, respectively, is stored in the device 14. As shown in the A and C curves of FIGURE 3, the bit current should overlap the writing portion of the unipolar word current pulse and also terminate after the word current pulse ends in order to write successfully into the device 14.

The switch 26 has been shown and described as being a simple mechanical switch. As already described, it can be made to operate in conjunction with a common clocking circuit (not shown) which may be used to trigger in unison the unipolar current pulse generator 20 and the direct current generator 25. However, the apparatus of this invention contemplates a very fast and precise operation and, therefore, the use of an electronic switch in place of the switch 26 is more likely. Such electronic switching arrangements are well known and, therefore, it is not necessary to describe them. However, one mode of circuit operation could provide for a direct connection to be made among the generator 25, the amplifier 24 and the winding 22. A circuit arrangement could be provided for desensitizing the sense amplifier during all periods other than the reading portion of the read-write cycle. This could be accomplished using known circuitry and would involve connecting the clock circuit to the sense amplifier. Another way for performing this operation would be to provide the direct current generator 25 with a built-in delay which would delay the beginning of its output to the winding 22 until the beginning of the write portion of the read-write cycle for the apparatus. Thus, there would be no overlap between the operation of the generator 25 and the sense amplifier 24. Alternatively, a separate sense winding could be employed for the sense operation. This winding would thread the aperture in the toroidal part of the storage device and act to sense the signal indicative of the state of information stored in the unit.

The mode of reading described is destructive in nature. If the magnetic material employed as the storage medium is isotropic, then the magnetic fields are forced into a position transverse to that of a storage position remaining there until writing is accomplished in the particular unit. On the other hand, if an anisotropic magnetic material is employed, the material breaks up into magnetic domains having a random organization within the material.

Anisotropy is achieved by applying a magnetic field parallel to the conductive strip during the process of plating the nickel-iron layer on the copper substrate. The magnetic flux produced by this field in the initially deposited material causes the easy direction of magnetization to be parallel to the storage directions in the toroidal portions. The induced anisotropy enables the unit to be operated with a considerably shorter cycle time. For example, in order to achieve sufficient stability in isotropic devices, the bit current has to be applied for a longer period of time after termination of the word current than for an isotropic device, i.e., operation with an isotropic layer is carried on for about seven hundred nanoseconds whereas for oriented anisotropic material this time is substantially shortened to the order of one hundred nanoseconds.

Nondestructive read out is also possible with this apparatus. If the unipolar read pulse is of sufficiently short duration and/or of small enough amplitude, then the fields of the magnetic material may revert back to their original positions. Ideally, complete nondestructive read out is achieved.

As already described, the word current, as shown in the A curve of FIGURE 3, may be a continuous unipolar current pulse having a time duration sufficient to accomplish both the reading and writing operations. Application of such a pulse results in large amounts of power dissipation particularly where the regeneration time required by the array is long. To reduce these power requirements, individual spikes, such as shown in the B curve of FIGURE 3, may be employed to effect reading and writing in a particular storage device. The first spike brings about the read out of the information from the device during its initial transition and the second spike occurs during the time that the bit current pulse is applied from the direct current generator 25 to the winding 22.

The disturb currents generated during the storage operation might affect the storage device so that the output signal for read out pulses cannot provide sufficient discrimination between the indications of a binary 1 and a binary 0. One way of improving the performance of the storage operation in a particular device is to use a post write disturb pulse at the end of each bit current pulse. This technique is shown in the E curve of FIGURE 3. The signal-to-noise relationship of a selected device is improved and the effects of any disturb currents are diminished. The post write disturb technique adds to the write cycle time by adding a negative excursion to each positive write pulse and by lengthening each negative write pulse.

An alternative mode of writing is to effect the storage without using coincident word and bit currents. By first applying a word pulse to the memory unit, the magnetic material is placed in a quasi-stable orientation. Thereafter, the next following bit current pulse produces a magnetic field having a flux orientation orthogonal to that established by the word pulse. The magnetic field of the material is thereby reoriented so that an effective flux component in the bit direction is established. This flux component has a polarity indicative of the stored information. The storage status of this device can be detected after an arbitrary number of consecutive bit currents of any polarity of sequence.

The storage devices described in carrying out the principles of the invention have been toroidal in shape with a substantially uniform distribution of magnetic material deposited on the substrate. However, improved performance results if the main storage location of the device becomes larger and the branching area, which generally acts against optimum device performance, remains constant. As the ratio of orthogonal area versus branching area increases, the stability of the device is improved. This can be accomplished according to the principles of the invention by increasing the cross sectional area or amount of distribution of the magnetic material at certain portions of the device, such as at the branching areas. Another way to accomplish this is to alter the shape of the device and to apply a greater amount of the material at certain portions of the device than at other portions.

An example of the latter alternative provides for the use of an elongated chain storage device (refer to FIGURE 4). This arrangement provides for the elongated sections 41 and 42 to be situated between the branching portions 43 and 44 which connect to the neck portions 45 and 46 between adjacent storage devices. It is readily apparent that the configuration of this device provides for the orthogonal area, which is the main storage location, to be larger than the branching area, which remains constant. The greater amount of magnetic material can then be applied at the branching areas.

In the same manner as in the toroidal configuration shown in FIGURE 1, the elongated device is also a closed flux path device. However, it provides a more uniform bit field and a more perfect word flux closure. Also, the main storage portion of the elongated device is straight and, therefore, more susceptible to a uniform orienting field along the chain. A further advantage of this arrangement is to reduce the criticality in the positioning of the bit sense conductive winding within the aperture of the device. Since the orthogonal area is greater, the registration problem of the winding is less severe.

While this invention has been particularly shown and described with reference to a preferred embodiment thereof, it will be understood by those skilled in the art that the foregoing and other changes in form and details may be made therein without departing from the spirit and scope of the invention.

What is claimed is:

1. A chain memory, comprising
an electrically conductive strip having at least one aperture therein and having magnetic material deposited around the aperture and including an area of the strip contiguous to the aperture having a greater amount of magnetic material deposited thereon than the remaining area.

2. The memory of claim 1 wherein the area of the strip contiguous to the aperture includes branching and elongated areas, the branching area of the chain having the greater amount of material than the elongated area.

3. A chain memory, comprising
a conductive strip having at least one aperture therein,
and amagnetic material deposited on the entire surface of the conductive strip around the aperture to form a storage device,
said storage device comprising elongated straight portions and branching portions.

References Cited

UNITED STATES PATENTS

| | | | |
|---|---|---|---|
| 2,722,603 | 11/1955 | Dimond | 340—174 |
| 3,213,435 | 10/1965 | Bruce | 340—174 |

OTHER REFERENCES

Anderson, J. L.: Leilich, H. O., and Redfield, D. H., IBM Technical Disclosure Bulletin, "Cross Core Memory Construction," vol. 5, No. 7, December 1962, page 60.

Leightner, R. A., and Schroeder, E. N.: IBM Technical Disclosure Bulletin, "Memory Core Selection System," vol. 5, No. 7, December 1962, page 61.

TERRELL W. FEARS, *Primary Examiner.*